United States Patent [19]
Crawley

[11] Patent Number: 5,174,587
[45] Date of Patent: Dec. 29, 1992

[54] NON-SLIP DRILL CHUCK

[76] Inventor: Thomas E. Crawley, 3700 Crestview Pl., Cleveland, Tenn. 37311

[21] Appl. No.: 765,525

[22] Filed: Sep. 25, 1991

[51] Int. Cl.5 .................. B23B 31/12; B25B 13/44
[52] U.S. Cl. .................................. 279/60; 81/16; 279/147
[58] Field of Search .......... 279/140, 147, 1 K, 60–65; 81/16

[56] References Cited

U.S. PATENT DOCUMENTS

| | | | |
|---|---|---|---|
| 1,038,755 | 9/1912 | Hubbell | 279/62 |
| 1,489,976 | 4/1924 | Brown | 279/147 X |
| 3,190,665 | 6/1965 | Sztricsko | 279/147 |
| 4,123,195 | 10/1978 | Purviance | 279/147 X |
| 4,615,653 | 10/1986 | Watson | 279/147 X |
| 4,999,018 | 3/1991 | Wenz, Jr. | 279/147 X |

Primary Examiner—Steven C. Bishop
Attorney, Agent, or Firm—Richard L. Miller

[57] ABSTRACT

A non-slip drill chuck apparatus is provided on a hand drill. The drill chuck has a shell with bevel gear teeth for use with drill motors and the like, a stationary collar which extends from the shell and a plurality of adjustable jaws that extends from the stationary collar. The apparatus consists of a chuck key mechanism for engagement with the collar and the shell for non-inadvertently disengagable tightening the jaws of the drill chuck tighter about a drill bit to prevent slippage of the drill bit, so as not to cause damage to the drill bit and the drill chuck itself.

2 Claims, 1 Drawing Sheet

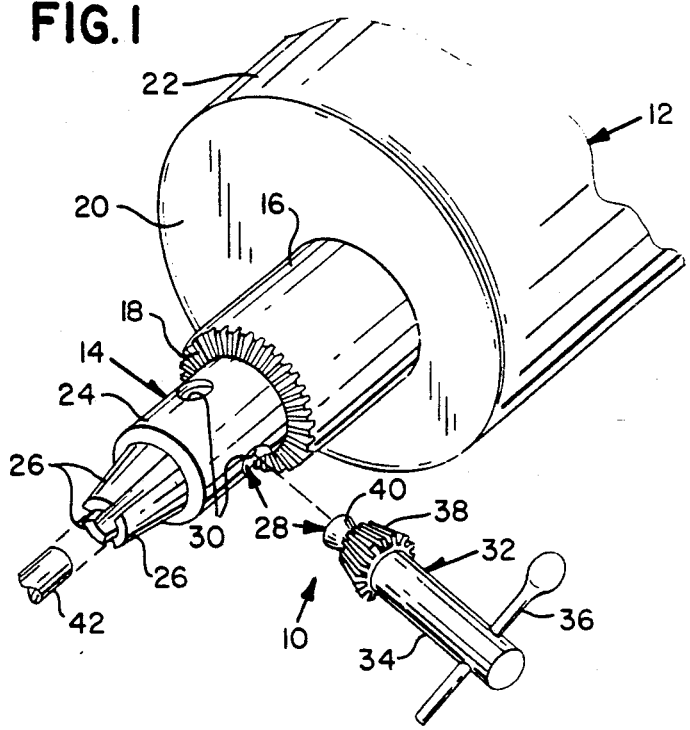
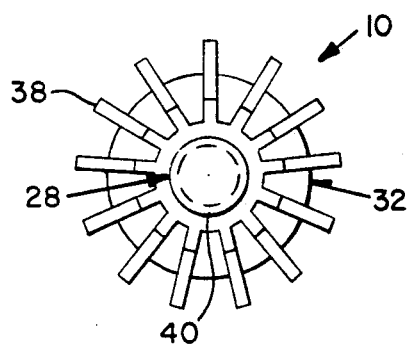
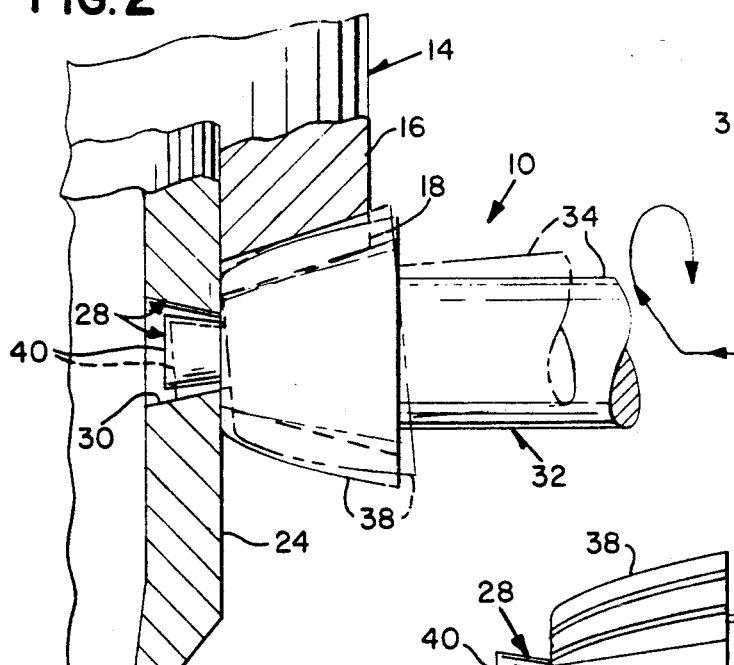
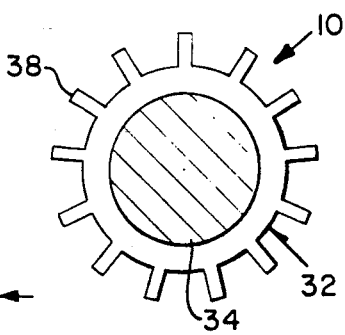
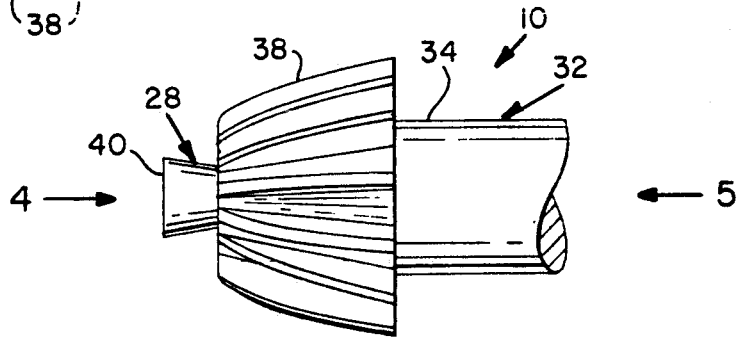

NON-SLIP DRILL CHUCK

BACKGROUND OF THE INVENTION

The instant invention relates generally to drill chucks and more specifically it relates to a non-slip drill chuck apparatus.

Numerous drill chucks have been provided in the prior art that are adapted to hold bits therein by adjustable jaws, so that the bits can be driven by the drills. For example, U.S. Pat. Nos. 3,458,209 to Scholz; 3,545,776 to Haviland and 4,781,083 to Cummings all are illustrative of such prior art. While these units may be suitable for the particular purpose to which they address, they would not be as suitable for the purpose of the present invention as hereafter described.

SUMMARY OF THE INVENTION

A primary object of the present invention is to provide a non-slip drill chuck apparatus that will overcome the shortcomings of the prior art devices.

Another object is to provide a non-slip drill chuck apparatus with a matching chuck key so that during the tightening procedure the jaws of the drill chuck can be drawn tighter on the drill bit, thus preventing slipping of the bit so as not to cause damage to the bit and the drill chuck itself.

An additional object is to provide a non-slip drill chuck apparatus in which its collar has an outwardly tapered bore to receive an inwardly tapered stem of the chuck key so that when torque is applied, the chuck will be tightened around the bit to a greater pressure caused by the chuck key not being allowed to slip out of engagement with the bevel gear teeth on the shell of the drill chuck.

A further object is to provide a non-slip drill chuck apparatus that is simple and easy to use.

A still further object is to provide a non-slip drill chuck apparatus that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only and that changes may be made in the specific construction illustrated and described within the scope of the appended claims.

BRIEF DESCRIPTION OF THE DRAWING FIGURES

The figures in the drawings are briefly described as follows:

FIG. 1 is a perspective view of the instant invention;

FIG. 2 is a greatly enlarged diagrammatic view with parts in section illustrating how the key cooperates with the chuck;

FIG. 3 is a diagrammatic perspective view of just the key per se with parts broken away;

FIG. 4 is a view taken in the direction of arrow 4 in FIG. 3; and

FIG. 5 is a view taken in the direction of arrow 5 in FIG. 3.

DETAILED DESCRIPTION OF THE PREFERRED EMBODIMENTS

Turning now descriptively to the drawings, in which similar reference characters denote similar elements throughout the several views, the Figures illustrate a non-slip drill chuck apparatus 10, on a hand drill 12. The drill chuck 14 has a shell 16 with bevel gear teeth 18 that is rotatable on one side 20 of a motor housing 22. A stationary collar 24 extends from the shell 16 and a plurality of adjustable jaws 26 extend from the stationary collar 24. The apparatus 10 consists of a mechanism 28 between the collar 24 and the shell 16 for tightening the jaws 26 of the drill chuck 14 tighter about a drill bit 30 to prevent slippage of the drill bit 30, so as not to cause damage to the drill bit 30 and the drill chuck 14 itself.

The tightening mechanism 28 includes the collar 24 having a least one outwardly tapered bore 30 therethrough. A chuck key 32 has a shank 34, a transverse handle 36 through one end of the shank 34, a bevel gear head 38 on an opposite end of the shank 34, and an inwardly tapered stem 40 extending from the bevel gear head 38 which can be received into the at least one outwardly tapered bore 30 in the collar 24, so that when the chuck key 32 is rotated the bevel gear head 38 will move to properly engage with the bevel gear teeth 18 on the shell 16 and not slip therefrom.

The at least one outwardly tapered bore 30 in the collar 24 is sized to allow the inwardly tapered stem 40 of the chuck key 32 to fit therein and be tipped to bear against one side thereof, so that greater torque can be applied directly from the bevel gear head 38 of the chuck key 32 to the bevel gear teeth 18 on the shell 16 of the drill chuck 14.

The tapered stem 40 extending from the bevel gear head 38 prevents the chuck key 32 from inadvertently slipping from outwardly tapered bore 30 in the collar 24, thus allowing for this greater torque.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. A non-slip drill chuck apparatus on a hand drill, the drill chuck apparatus being of the type having a shell with bevel gear teeth that is rotatable on one side of a motor housing, a stationary collar extending from the shell and a plurality of adjustable jaws extending from the stationary collar, said drill chuck apparatus comprising disengagable means between the collar and the shell for tightening the jaws of the drill chuck apparatus tighter about a drill bit to prevent slippage of the drill bit, so as not to cause damage to the drill bit and the drill chuck apparatus itself, wherein said disengagable tightening means includes:

a) the collar having a least one outwardly tapered bore therethrough; and b) a chuck key having a shank, a transverse handle through one end of the shank, a bevel gear head on an opposite end of the shank and an inwardly tapered stem extending from the bevel gear head which can be received into the at least one outwardly tapered bore in the collar, so that when the chuck key is rotated the bevel gear head will move to properly engage with the bevel gear teeth on the shell and not slip therefrom.

2. A non-slip drill chuck apparatus as recited in claim 1, wherein the at least one outwardly tapered bore in the collar is sized to allow the inwardly tapered stem of the chuck key to fit therein an be tipped to bear against one side thereof, so that greater torque can be applied directly from the bevel gear head of the chuck key to the bevel gear teeth on the shell of the drill chuck apparatus.

* * * * *